United States Patent
Mahasintunan

(12) 
(10) Patent No.: US 7,877,702 B2
(45) Date of Patent: Jan. 25, 2011

(54) TREE WIDGET DATA POPULATION

(75) Inventor: Gim Mahasintunan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 674 days.

(21) Appl. No.: 11/943,164

(22) Filed: Nov. 20, 2007

(65) Prior Publication Data

US 2009/0132956 A1    May 21, 2009

(51) Int. Cl.
G06F 3/048    (2006.01)
(52) U.S. Cl. .................. 715/784; 715/786; 715/787; 715/830; 715/853; 715/854; 715/855; 707/797; 707/822; 707/828
(58) Field of Classification Search ......... 715/784–787, 715/830, 831, 853–855, 973; 707/711, 741, 707/786, 797, 822, 828–831
See application file for complete search history.

(56) References Cited

U.S. PATENT DOCUMENTS

| | | | | |
|---|---|---|---|---|
| 6,760,758 B1 * | 7/2004 | Lund et al. | ................. | 709/217 |
| 6,973,457 B1 * | 12/2005 | Bastawala et al. | ........... | 707/770 |
| 2004/0019613 A1 * | 1/2004 | Jones et al. | ................. | 707/200 |
| 2004/0205622 A1 * | 10/2004 | Jones et al. | ................. | 715/523 |
| 2006/0117051 A1 * | 6/2006 | Chin | ........................ | 707/101 |
| 2009/0100373 A1 * | 4/2009 | Pixley et al. | ................ | 715/786 |

* cited by examiner

Primary Examiner—Ba Huynh
(74) Attorney, Agent, or Firm—Cantor Colburn LLP; Elissa Wang

(57) ABSTRACT

A method and computer program product for automatically populating data in a tree widget on a Web page are provided. The method includes rendering a tree structure of tree nodes populated with data in a viewable area of a Web page, creating placeholder nodes without data in the tree structure, and placing the placeholder nodes in a hidden area of the Web page. The method also includes monitoring for a scrolling request to shift the tree structure in the viewable area of the Web page, and initiating an asynchronous request for data to populate a subset of the placeholder nodes in response to the scrolling request. The method further includes receiving the data to populate the subset of placeholder nodes, populating the subset of placeholder nodes with the received data, and shifting the subset of placeholder nodes with the received data to the viewable area of the Web page.

6 Claims, 3 Drawing Sheets

TREE WIDGET DATA POPULATION

BACKGROUND OF THE INVENTION

1. Field of the Invention

This invention relates to computer-based Web technology, and particularly to automatically populating data in a tree widget for smooth scrolling in a Web browser.

2. Description of Background

Web pages often contain static content that requires refreshing or manual clicking on buttons or icons to reload an entire page of content. A Web page accessing a long list of information as part of the content can result in a substantial delay for a user of the Web page, as all of the content included on the Web page is loaded. With the development of "Web 2.0", there has been an effort to present Web content in more a dynamic and interactive fashion, making Web pages appear similar to other user applications. Web pages can be constructed using component or control toolkits that comply with standards, such as the document object model (DOM) standard. DOM is a platform and language independent standard object model for representing Hypertext Markup Language (HTML) or Extensible Markup Language (XML) and related formats. Although DOM is not required for rendering an HTML Web page, scripting languages attempting to inspect or modify a Web page dynamically, e.g., JavaScript®, may require DOM compliance.

Web pages can be apportioned into sub-windows or regions using widgets as control interfaces for specific functions. One type of widget that is useful in displaying long lists with hierarchical structures is a tree widget. Tree widgets are typically considered fairly expensive controls in terms of memory consumption and processing time, since they can potentially expand to an unlimited number of tree nodes. This becomes a serious problem in Web browsers that are limited to the number of DOM tree nodes they can handle. Existing tree widgets scale very poorly when trying to suddenly introduce a large number of additional nodes into an internal DOM tree of a Web browser.

Web 2.0 applications are expected to be highly interactive and responsive to user clicks and operations, but existing tree widgets do not scale well in enterprise-level applications to handle a large number of tree nodes in a near seamless manner. Therefore, it would be beneficial to develop a tree widget that can rapidly respond to user interactions, such as scrolling requests to view different portions of the tree, with a smooth and rapid response regardless of the number of nodes in the tree. Accordingly, there is a need in the art for a method to automatically populate data in a tree widget for smooth scrolling in a Web browser.

SUMMARY OF THE INVENTION

The shortcomings of the prior art are overcome and additional advantages are provided through the provision of a computer implemented method for automatically populating data in a tree widget on a Web page. The method includes rendering a tree structure of tree nodes populated with data in a viewable area of a Web page, creating one or more placeholder nodes without data in the tree structure, and placing the one or more placeholder nodes in a hidden area of the Web page. The method also includes monitoring for a scrolling request to shift the tree structure in the viewable area of the Web page, and initiating an asynchronous request for data to populate a subset of the one or more placeholder nodes in response to the scrolling request. The method further includes receiving the data to populate the subset of the one or more placeholder nodes, populating the subset of the one or more placeholder nodes with the received data, and shifting the subset of the one or more placeholder nodes with the received data to the viewable area of the Web page.

A computer program product corresponding to the above-summarized method is also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECT

As a result of the summarized invention, a solution has been technically achieved which automatically populates data in a tree widget for smooth scrolling in a Web browser.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Exemplary embodiments, as shown and described by the various figures and the accompanying text, provide a method and computer program product for automatically populating data in a tree widget for smooth scrolling to view a tree of nodes in a Web browser. Since a tree of nodes in a tree widget can extend much further than available viewing area on a Web page, a user must scroll to view the rest of the nodes in the tree that are not in the viewing area. The tree widget initially shows a subset of the tree nodes and then monitors user activity for scrolling events activated by the user moving a scrollbar, mouse wheel, or keyboard. As the user scrolls, asynchronous requests are made to a server to retrieve necessary information to fill in unpopulated nodes in the tree. In an exemplary embodiment, an Asynchronous JavaScript® and XML (AJAX)-enabled tree widget is used for automatic data population. AJAX exchanges small amounts of data with the server behind the scenes, so that the entire Web page displayed by the Web browser does not have to be reloaded each time the user requests a change.

In an exemplary embodiment, the tree widget uses placeholder (i.e., empty) nodes for information in the tree that has not been populated with data from the server. As the placeholder nodes are populated, the placeholder nodes become fully constructed nodes stored in the tree. When the user scrolls back over previously viewed tree nodes, further requests to the server are not necessary, as the already constructed nodes are presented. This approach enables tree scaling to thousands of tree nodes, with no perceivable loss in performance to the user. For example, the responsiveness of scrolling through a tree with ten nodes is approximately the same as a tree with 10,000 nodes.

Upon instantiation of the tree widget, nodes created to fill the viewable area are populated, while placeholder nodes are created to maintain correct scrollbar positioning. Once the user moves the scrollbar down, fully constructed nodes are moved into a hidden area above the viewable area, while the placeholder nodes in a hidden area below the viewable area are fully constructed and made viewable. This permits fast scrolling (i.e., where many empty nodes are skipped), as well as "jogging" the scrollbar to individual positions. Further details regarding automatically populating data in a tree widget for smooth scrolling in a Web browser are provided herein.

Figure 1:
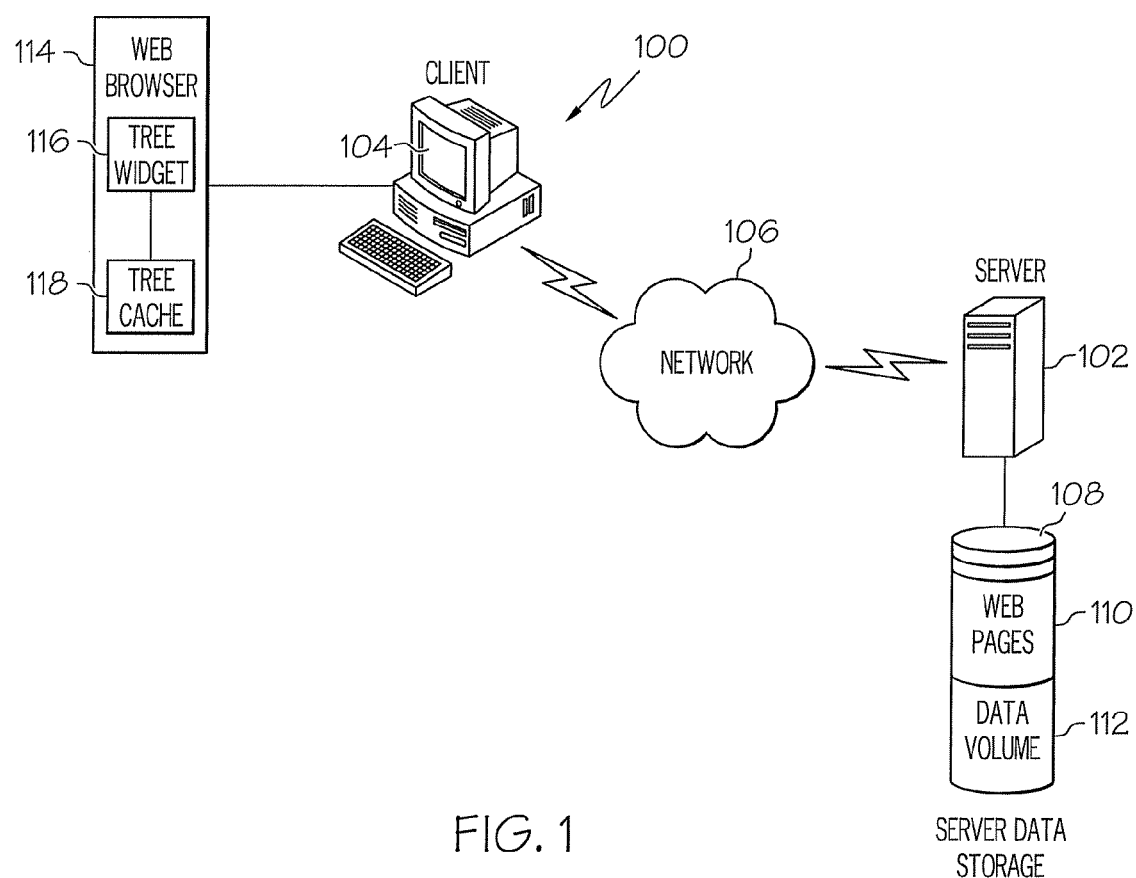
FIG. 1 depicts an example of a computer system for automatically populating data in a tree widget for smooth scrolling in a Web browser.

Turning now to the drawings, it will be seen that in FIG. 1 there is a block diagram of a system 100 for automatically populating data in a tree widget for smooth scrolling in a Web browser that is implemented in accordance with exemplary embodiments. The system 100 of FIG. 1 includes a server 102 in communication with a client system 104 via a network 106. The server 102 may include one or more high-speed processors for handling a large volume of communication activities from the client system 104, such as performing Web server tasks. The Web server tasks can include accessing a server data storage device 108 to provide one or more Web pages 110 to the client system 104. The server 102 may also access a data volume 112 on the server data storage device 108 to provide the client system 104 with data associated with the Web pages 110. While only a single server 102 is shown in FIG. 1, it will be understood that multiple servers can be implemented, each in communication with one another via direct coupling or via one or more networks. For example, multiple servers 102 may be interconnected through a distributed network architecture. Similarly, the server 102 can communicate with multiple client systems 104, although only a single client system 104 is depicted. The client system 104 may comprise a general-purpose computer processing device that generates requests to the server 102 for the Web pages 110 and associated data from the data volume 112.

The network 106 may be any type of communications network known in the art. For example, the network 106 may be an intranet, extranet, or an internetwork, such as the Internet, or a combination thereof. The network 106 can include wireless, wire, and/or fiber optic links.

The server data storage device 108 refers to any type of storage and may comprise a secondary storage element, e.g., hard disk drive (HDD), tape, or a storage subsystem that is internal or external to the server 102. In alternate exemplary embodiments, the server data storage device 108 includes one or more solid-state devices, such as ROM, PROM, EPROM, EEPROM, flash memory, NOVRAM or any other electric, magnetic, optical or combination memory device capable of storing data (i.e., a storage medium), some of which represent executable instructions for the server 102. It will be understood that the server data storage device 108 shown in FIG. 1 is provided for purposes of simplification and ease of explanation and is not to be construed as limiting in scope. To the contrary, there may be multiple server data storage devices 108 utilized by the server 102.

A user of the client system 104 can execute a Web browser 114 to view Web content (e.g., Web pages 110) provided by the server 102. A tree widget 116 may be visible via the Web browser 114, providing a scrolling interface for a tree structure of nodes, e.g., a virtual file system interface. In an exemplary embodiment, the tree widget 116 makes requests to the server 102 to get data from the data volume 112 to populate a tree structure. As the requested data is received via the network 106, the tree widget 116 can store a local copy in a tree cache 118 in the Web browser 114. Storing data locally to the tree cache 118 can reduce traffic on the network 106, providing a faster response time for user requests of information held within the tree cache 118.

Figure 2:
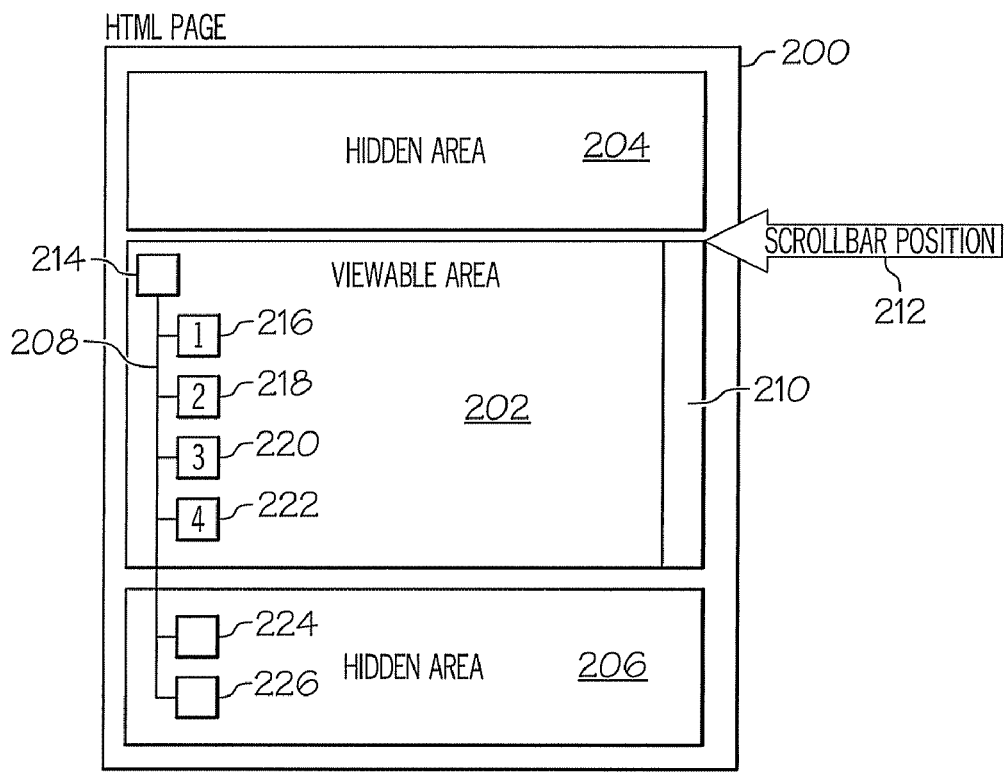
FIG. 2 depicts an example of a Web page with hidden areas for smooth scrolling.

Turing now to FIG. 2, an exemplary Web page is depicted graphically as Web page 200, which may be coded in HTML. The Web page 200 can be displayed on the client system 104 of FIG. 1 using the Web browser 114. The tree widget 116 of FIG. 1 creates a viewable area 202, as well as an upper hidden area 204 and a lower hidden area 206 for displaying a tree structure 208. A user can actuate a scrollbar 210 associated with the viewable area 202 to select a scrollbar position 212. For example, the user can use a mouse driven pointer (not depicted) on the client system 104 to click on the scrollbar 210 and scroll up or down, altering the scrollbar position 212. The tree structure 208 includes a root node 214, with multiple tree nodes 216, 218, 220, 222, 224, and 226 connected below the root node 214. In an exemplary embodiment, the tree nodes 216-222 are initially located within the viewable area 202, and are fully constructed to include data from the data volume 112 of FIG. 1. The tree nodes 224 and 226 are initially located within the lower hidden area 206, and as such are placeholder nodes without data. Accordingly, the tree nodes 224 and 226 of FIG. 2 are also referred to as placeholder nodes 224 and 226. The upper hidden area 204 initially includes no elements of the tree structure 208.

Figure 3:
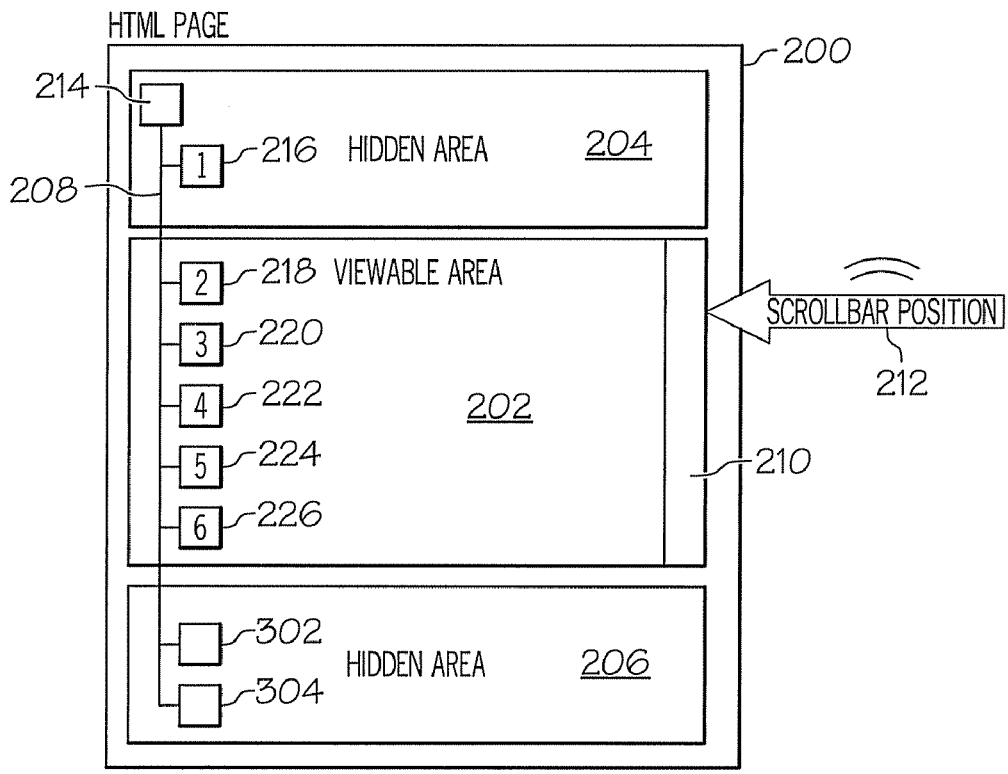
FIG. 3 depicts an example of shifting a tree in a viewable area of a Web page while automatically populating tree data in previously hidden nodes for smooth scrolling as scrollbar position changes.

As the scrollbar 210 is scrolled, shifting the scrollbar position 212, several fully constructed nodes (e.g., root node 214 and tree node 216) are shifted into the upper hidden area 204, while previously hidden tree nodes 224 and 226 are fully constructed and moved from the lower hidden area 206 into the viewable area 202, as depicted in FIG. 3. The tree widget 116 of FIG. 1 creates new tree nodes 302 and 304 as placeholder nodes in the tree structure 208 and keeps them in the lower hidden area 206 for further scrolling. The tree widget 116 may write the contents of the root node 214 and tree node 216 to the tree cache 118 to keep them available locally, in case the user alters the scrollbar position 212 to shift the root node 214 and tree node 216 back into the viewable area 202. A subset of placeholder nodes, such as the tree nodes 302 and 304, can be populated with data from the data volume 112 while in the lower hidden area 206 but prior to a user scrolling. Alternatively, the placeholder tree nodes 302 and 304 are populated with data in response to a user scroll request shifting the tree nodes 302 and 304 into the viewable area 202. Thus, the tree widget 116 automatically populates tree nodes asynchronous to a user request to load the Web page 200. For example, assuming the tree structure 208 includes one hundred tree nodes, the tree widget 116 may request data from the data volume 112 to populate ten of the tree nodes in the lower hidden area 206 that are closest to the viewable area 202, such that a rapid response to a user scroll request is achieved. Using the upper hidden area 204 and lower hidden area 206 as buffer zones for the viewable area 202 enables the tree widget 116 to support smooth scrolling without requesting all of the data for the tree structure 208 upon loading the Web page 200 or re-requesting data already received.

Figure 4:
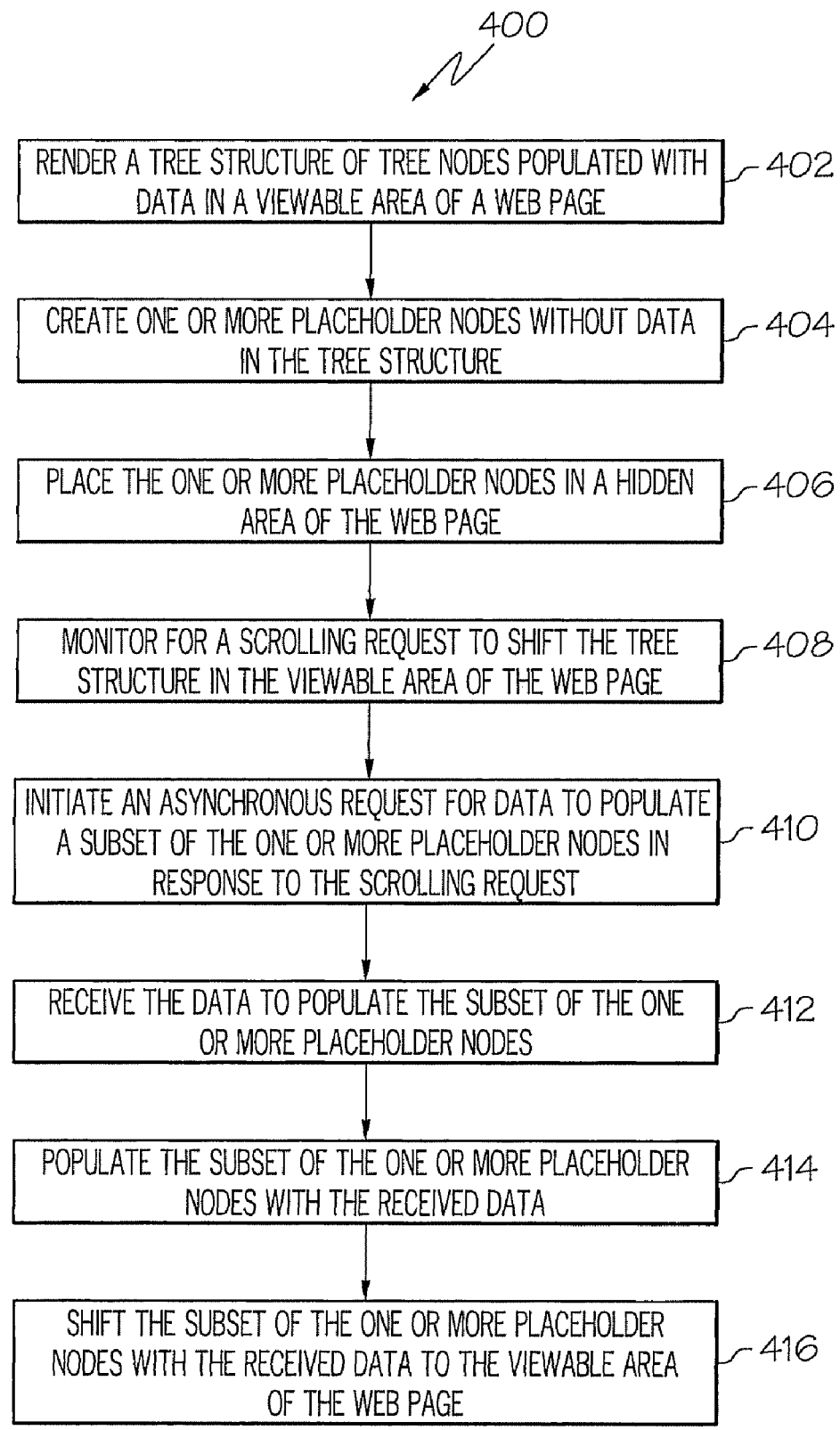
FIG. 4 depicts a process for automatically populating data in a tree widget for smooth scrolling in a Web browser in accordance with exemplary embodiments.

Turning now to FIG. 4, a process 400 for automatically populating data in a tree widget for smooth scrolling in a Web browser will now be described in accordance with exemplary embodiments, and in reference to the system 100 of FIG. 1. A user can initiate the tree widget 116 of FIG. 1 to perform the process 400 on the client system 104 via the Web browser 114 requesting one of the Web pages 110 that includes a tree structure from the server 102. At block 402, the tree widget 116 renders a tree structure of tree nodes populated with data in a viewable area of a Web page on the Web browser 114. For example, the Web page may be the Web page 200 as depicted in FIG. 2, with the multiple nodes of the tree structure 208 made visible in the viewable area 202.

At block 404, the tree widget 116 creates one or more placeholder nodes without data in the tree structure (e.g., placeholder nodes 224 and 226 of FIG. 2). At block 406, the tree widget 116 places the one or more placeholder nodes in a hidden area of the Web page. The hidden area may be the lower hidden area 206 of FIG. 2, assuming the root node 214 of the tree structure 208 is in the viewable area 202.

At block 408, the tree widget 116 monitors for a scrolling request to shift the tree structure in the viewable area of the Web page. For example, the user of the client system 104 can interact with the scrollbar 210 of FIG. 2 to adjust the scrollbar position 212, as can be seen in the relative changes between FIGS. 2 and 3.

At block 410, the tree widget 116 initiates an asynchronous request for data to populate a subset of the one or more placeholder nodes in response to the scrolling request. The tree widget 116 may be AJAX compliant, placing a request for a small amount of data needed to populate the placeholder nodes 224 and 226 of FIG. 2 with data from the data volume 112 via the server 102. The subset of one or more placeholder nodes can include all placeholder nodes in the lower hidden area 206 of FIG. 2, or may be equivalent to the number of placeholder nodes that will be shifted to the viewable area 202 in response to the scrolling request. At block 412, the tree widget 116 receives the data to populate the subset of the one or more placeholder nodes from the server 102. At block 414, the tree widget 116 populates the subset of the one or more placeholder nodes with the received data.

At block 416, the tree widget 116 shifts the subset of the one or more placeholder nodes with the received data to the viewable area of the Web page. For example, as depicted in FIG. 3, the placeholder nodes 224 and 226 populated with received data (as fully constructed tree nodes) are shifted into the viewable area 202 of the Web page 200, while additional placeholder nodes 302 and 304 remain in the hidden area 206. As the root node 214 and tree node 216 are shifted up and out of the viewable area 202, they disappear from view with respect to the user but remain in the upper hidden area 204. Data received from the server 102 can be written to the tree cache 118 to make it readily available to display in response to shifting the tree nodes stored in the tree cache 118 to the viewable area 202. Thus, the tree widget 116 need not make a request for data to the server 102 each time that the user adjusts the scrollbar position 212. The resulting effect is smooth scrolling, as perceived by the user, regardless of the size of the tree structure 208.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A computer implemented method for automatically populating data in a tree widget on a Web page, the method comprising:
    rendering a tree structure of tree nodes populated with data in a viewable area of a Web page;
    creating one or more placeholder nodes without data in the tree structure;
    placing the one or more placeholder nodes in a hidden area of the Web page;
    monitoring for a scrolling request to shift the tree structure in the viewable area of the Web page;
    initiating an asynchronous request for data to populate a subset of the one or more placeholder nodes in response to the scrolling request;
    receiving the data to populate the subset of the one or more placeholder nodes;
    populating the subset of the one or more placeholder nodes with the received data; and
    shifting the subset of the one or more placeholder nodes with the received data to the viewable area of the Web page.

2. The method of claim 1 wherein the hidden area is a lower hidden area below the viewable area.

3. The method of claim 2 further comprising an upper hidden area above the viewable area, wherein the tree nodes including data are shifted into the upper hidden area as the placeholder nodes are shifted from the lower hidden area to the viewable area.

4. The method of claim 3 wherein the tree nodes in the upper hidden area are stored to a tree cache.

5. The method of claim 4 wherein the tree nodes in the tree cache are accessed and displayed in response to shifting the tree nodes in the tree cache to the viewable area.

6. A computer program product for automatically populating data in a tree widget on a Web page, the computer program product comprising:
    a storage medium readable by a processing circuit and storing instructions for execution by the processing circuit for implementing a method, the method comprising:
        rendering a tree structure of tree nodes populated with data in a viewable area of a Web page;
        creating one or more placeholder nodes without data in the tree structure;
        placing the one or more placeholder nodes in a hidden area of the Web page;

monitoring for a scrolling request to shift the tree structure in the viewable area of the Web page;
initiating an asynchronous request for data to populate a subset of the one or more placeholder nodes in response to the scrolling request;
receiving the data to populate the subset of the one or more placeholder nodes;
populating the subset of the one or more placeholder nodes with the received data; and
shifting the subset of the one or more placeholder nodes with the received data to the viewable area of the Web page.

* * * * *